United States Patent [19]

Schillings

[11] 4,222,583
[45] Sep. 16, 1980

[54] UPPER LINK STORAGE DEVICE

[75] Inventor: Dieter Schillings, Bundesrepublik, Fed. Rep. of Germany

[73] Assignee: International Harvester Company, Chicago, Ill.

[21] Appl. No.: 964,024

[22] Filed: Nov. 27, 1978

[30] Foreign Application Priority Data

Nov. 24, 1977 [DE] Fed. Rep. of Germany ... 7735912[U]

[51] Int. Cl.³ .............................................. B60D 1/14
[52] U.S. Cl. ............................... 280/461 A; 172/439; 172/446; 280/491 B
[58] Field of Search ........... 280/461 A, 491 B, 460 A; 172/439, 446; 403/85, 100, 234; 248/62, 74 R, 354 R, 219.4, 218.4

[56] References Cited

U.S. PATENT DOCUMENTS

| 2,378,504 | 6/1945 | Roos | 280/491 B |
| 2,929,458 | 3/1960 | Cole | 172/446 |
| 3,053,552 | 9/1962 | Horney | 280/461 A |

FOREIGN PATENT DOCUMENTS

| 199421 | 9/1958 | Fed. Rep. of Germany | 403/234 |
| 223483 | 11/1968 | U.S.S.R. | 280/461 A |

*Primary Examiner*—John J. Love
*Assistant Examiner*—Donn McGiehan
*Attorney, Agent, or Firm*—Ronald C. Kamp; F. David AuBuchon

[57] ABSTRACT

An upper link storage device having a post secured to the cross bar of an inverted U-shaped bracket. A sleeve slidably retained on the upper link engages the post to positively arrest the upper link.

4 Claims, 4 Drawing Figures

UPPER LINK STORAGE DEVICE

The invention refers to an arresting device, suitable to secure a momentarily inoperational upper link of a three-point-hitch provided on farm tractors, whereby subject arrest device consists of a locking element mounted on the farm tractor and a coupling element which can be coupled to said securing element and is connected to the upper link.

An arresting device of the initially mentioned kind is disclosed in German Pat. No. 1 287 348. In this patented device the securing element, mounted on the farm tractor, consists of a spiral-shaped hook and the coupling element consists of a bar, hinged to the upper link. By hooking the securing element to the coupling element the upper link can be fastened to the tractor. Although this arrangement provides a generally satisfactory securing of the upper link, the disadvantage remains that no facilities are provided to prevent the upper link from recoiling. This is because only one securing device is provided in the rearward direction on this upper link holding device. Therefore, it is possible for the upper link to swing to the right and to the left as well as to recoil. This proves to be particularly disadvantageous, if, as is increasingly the case, farm tractors are equipped with an operator's cab, featuring a window pane at the rear. In these cases repeatedly the pane is frequently smashed by the recoiling upper link. Furthermore, an operation from the driver's seat is difficult, sometimes even impossible. Finally, a further disadvantage of the known arresting device must be seen in the fact that in the course of essential length adjustments on the upper link the holding bracket adopts a different position, so that the arresting is rendered difficult.

It is, therefore, an object of the present invention to provide an arresting device for releasably restraining an upper link, which device is relatively easy to engage and disengage and which may be engaged or disengaged without need to adjust or compensate for differences in the overall length of the upper link.

It is also an object of this invention to provide such a device which overcomes the disadvantages of similar prior art devices.

It is a further object to provide such a device which is relatively simple to manufacture and install, and which functions reliably and with consistency.

These and other objects, and many of the attendant advantages thereof, will become more readily apparent upon a perusal of the following description and the accompanying drawings, wherein.

Figure 1:
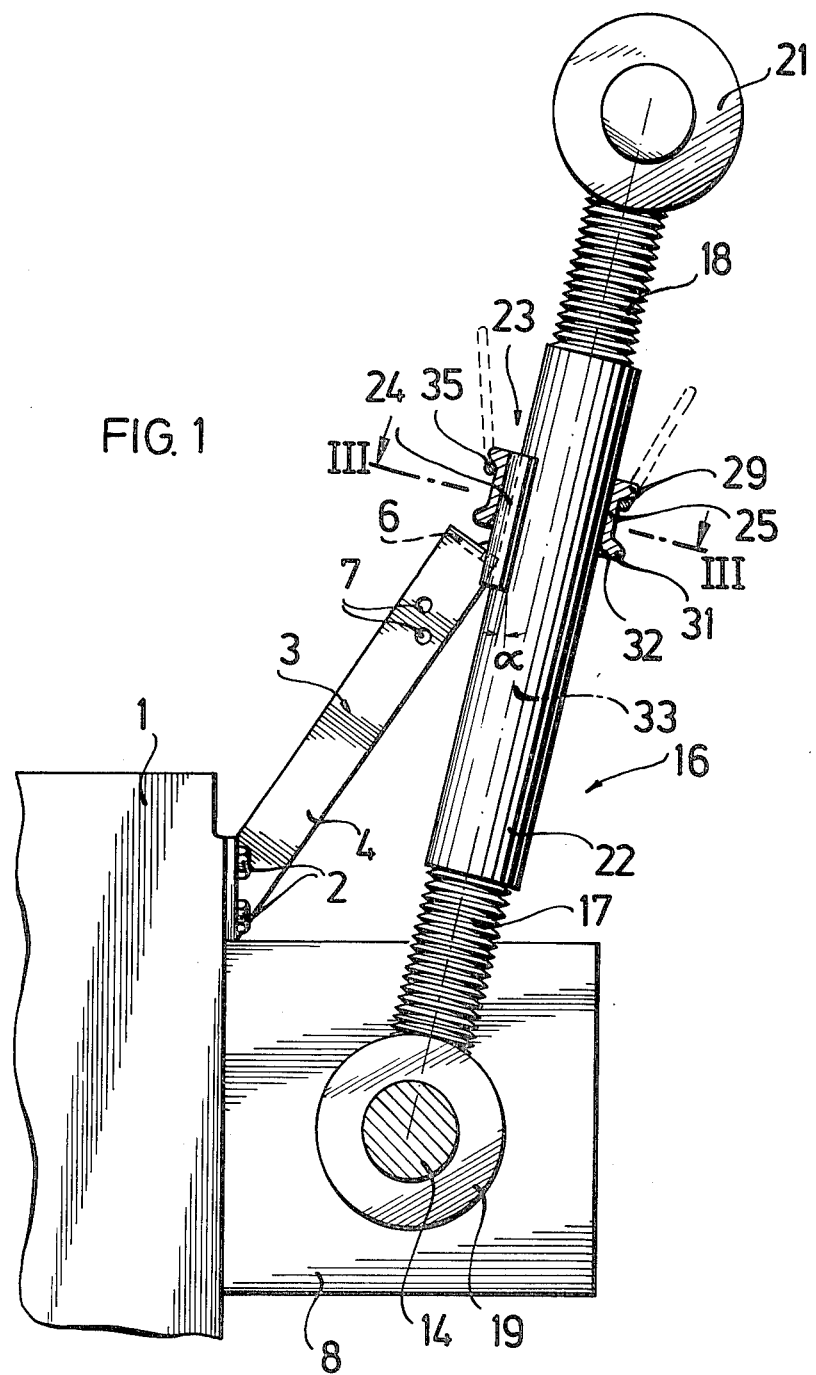
FIG. 1 is a side view of a portion of a farm tractor's rear section with a preferred embodiment of the present invention installed thereon.
Figure 2:
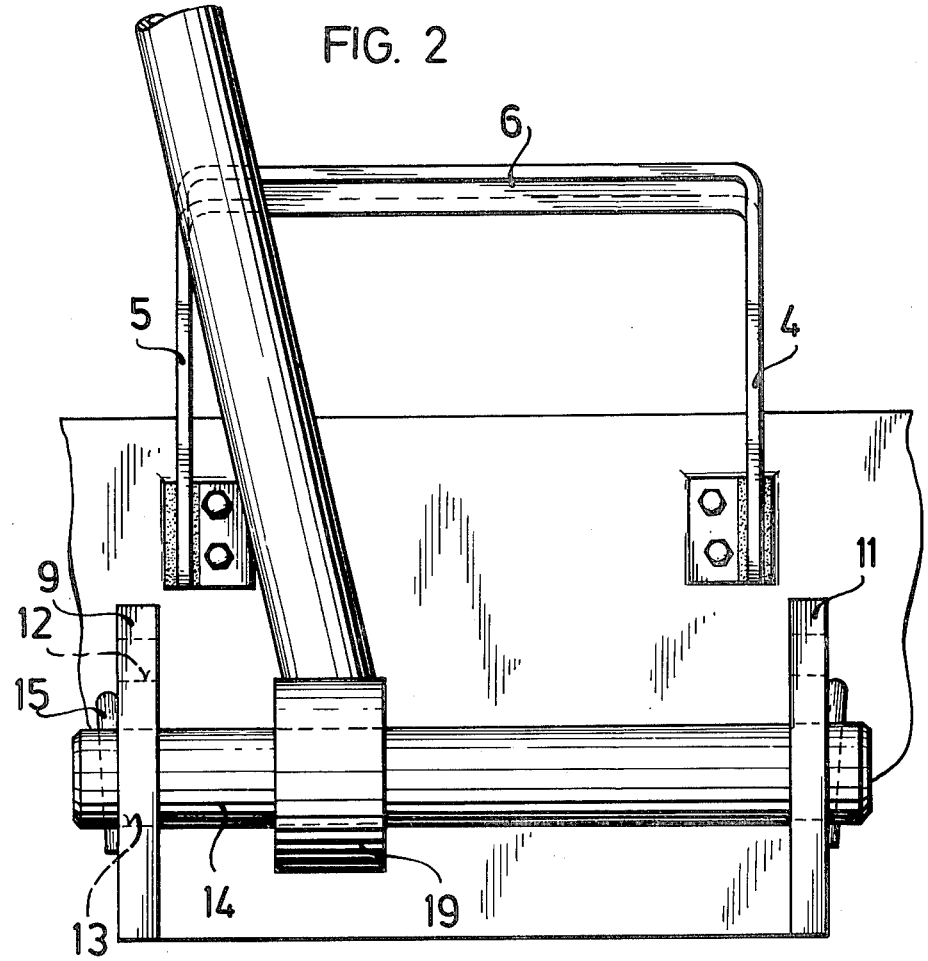
FIG. 2 is a rear view of the arrangement shown in FIG. 1.

Referring to FIGS. 1 and 2, the rear portion of a farm tractor's power lift housing, indicated generally at 1, has an inverted U-shaped bracket 3 secured thereto, such as by means of bolts 2. The bracket 3 consists of laterally spaced legs 4 and 5 interconnected by a crossbar 6. A support 8 is mounted to the rear of the farm tractor and has laterally spaced side walls 9 and 11 with aligned bores 13 therein. A bearing shaft 14 is passed through the aligned bores 13 and is secured from axial movement by split pins 15. The bearing shaft 14 rotatably supports an upper link 16 of a three-point hitch (not displayed in detail). The upper link 16 consists of link ends 17 and 18, equipped with bearing bosses 19 and 21 respectively, threadedly engaging an intermediate rotation of tie bar 22. Rotation of tie bar 22 permits the overall length of the upper link 16 to be adjusted.

Figure 3:
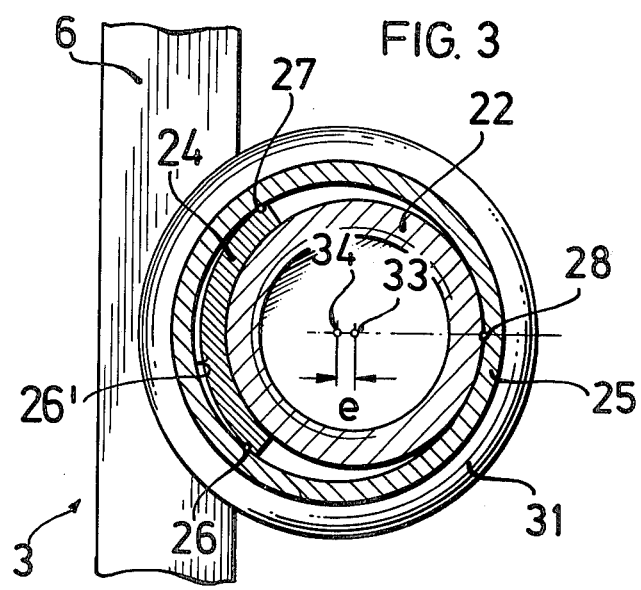
FIG. 3 is a cross-sectional view taken on line III—III of FIG. 1.

A locking device 23 is composed of a post 24 and a sleeve 25. The post 24 is secured to the cross bar 6, such as by welding and has a general shape similar to a semicircular segment of a right circular cylinder. The sleeve 25 is slidably supported on the upper link 16 and is capable of engaging the post 24. As shown in FIG. 1, the upper link 16 is in its arresting position with the sleeve 25 slipped over the post 24. As best seen in FIG. 3, the inner diameter 26 of the sleeve 25 is longer than the outer diameter of the tie bar 22. Compared to the central axis 34 of the inner diameter of the sleeve 25, the axis 33 of the tie bar 22 is arranged off center by the dimension 'e'. Thus, the sleeve 25 interacts with the post 24 and the tie bar 22 so that a three-point contact is established at 26, 27 and 28.

For better handling, the sleeve 25 is equipped with rim flanges 29 and 31. The sleeve 25 features a chamfer 32 at its end facing the post 24 to facilitate slipping the sleeve 25 over the post 24. In order to minimize forces acting on the locking device, the longitudinal axis of the post is inclined rearward at a narrow angle, e.g. 10°, from the vertical, so that the upper link 3 takes an inclined position displayed in FIG. 1 with the shaft 14 supporting most of the weight of the link 3.

The crossbar 6 has a length approximately equal to the length of one of the legs 4 and 5 so that even a laterally bent upper link 16 will be precluded from recoiling above the bar 6 and into contact with the tractor cab. In FIG. 1 a rope is secured to the sleeve 25 between the flanges 29 and 31 so that a pull in the upward direction will release the sleeve 25 from the post 24. Thus, it is possible to disengage the arresting device from the driver's seat.

Figure 4:
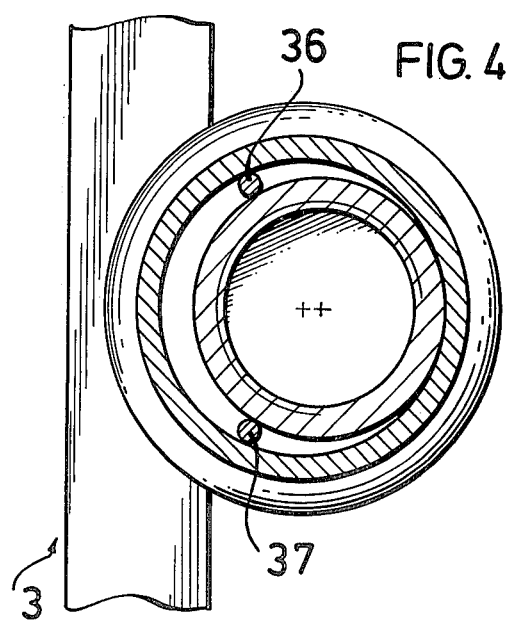
FIG. 4 is a cross-sectional view, similar to FIG. 3, illustrating another embodiment of the present invention.

In the case of the embodiment, shown in FIG. 4, the post 24 of semi-circular segment design is replaced by two pins 36 and 37, located in the vicinity of the contact points 27 and 26, and secured to the cross bar 6. The sleeve 25 engages the pins 36 and 37 in the same manner and with the same results as with the single post 24.

It can be seen from the above description that the upper link 3 will always take a fixed position in its storage condition which is of particular advantage with regard to clearances necessary for implements attached to the tractor but not requiring an upper link. In addition, it will be appreciated that the locking device 23, when engaged, secures the upper link in all directions and the cross bar 6, even when the locking device 23 is not engaged, protects the tractor cab, and particularly any window in the vicinity of the upper link, from being damaged by a recoiling upper link.

What is claimed is:

1. A storage device for temporarily arresting the upper link of a three-point hitch on a farm tractor comprising;

a bracket including a crossbar with a downward depending leg on each end attached to said tractor;

said crossbar being positioned between said link and said tractor to preclude contact therebetween when said link is rotated upwardly toward said tractor;

post means secured to said crossbar;

a sleeve slidably retained on said upper link and capable of being slid over said post to positively arrest said upper link.

2. A storage device according to claim 1 wherein said post means comprises a pair of parallel pins secured to said crossbar, said pins being spaced apart approximately the diameter of said link and being engageable by said sleeve.

3. A storage device according to claim 1 wherein said post means comprises a semi-circular segment of a right circular cylinder, the inner diameter of said sleeve being greater than the outer diameter of said segment.

4. A storage device for temporarily arresting the upper link of a three-point hitch on a farm tractor, wherein said upper link is rotatably mounted on a transverse shaft and is capable of being shifted laterally along said shaft; said device comprising;

a bracket including a crossbar with a downward depending leg formed on each end;

said legs being attached at their free ends to said tractor and each leg being substantially equal in length to the length of said crossbar;

said crossbar being positioned between said tractor and said upper link and having a length approximately the same as said shaft to thereby serve as a barrier to prevent the said upper link from rebounding into contact with said tractor regardless of the lateral position of said link on said shaft;

a post secured to said crossbar;

a sleeve slidably retained on said link and capable of engaging said post;

said post extending above said crossbar and having the shape of a semi-circular segment of a right circular cylinder, the outer diameter of which is less than the inner diameter of said sleeve.

* * * * *